United States Patent Office 2,913,443
Patented Nov. 17, 1959

2,913,443

CATALYTIC POLYMERIZATION OF DIOLEFINS USING PHOSPHORUS PENTOXIDE AND PRODUCT OBTAINED

James T. Edmonds, Jr., Bartlesville, Okla., assignor to Phillips Petroleum Company, a corporation of Delaware No Drawing. Application September 16, 1952
Serial No. 309,945

9 Claims. (Cl. 260—94.2)

This invention relates to the catalytic polymerization of diolefins. In one aspect the invention relates to the catalytic polymerization of open chain diolefins and cyclic dimers of butadiene. In another aspect the invention relates to a method for polymerizing certain diolefins in the presence of a catalyst under carefully regulated reaction conditions. In still another aspect the invention relates to novel polymers which are useful as softeners for elastomers and as constituents for coating compositions. In still another aspect the invention relates to a softened elastomer composition.

The polymerization of open chain diolefins and of vinylcyclohexenes has been practiced in the presence of certain catalysts such as sulfuric, hydrofluoric and phosphoric acids. Such processes have the disadvantages that the acid concentration of the catalyst must be carefully regulated within certain ranges and that control of the product composition is difficult. For example, when sulfuric acid is used as the catalyst the concentration of the acid must be maintained within the range 25 to 65%. Furthermore, where the said acids are used as catalysts for diolefin polymerization of the type herein described, yields are low and long reaction times are required.

According to this invention, certain diolefins are polymerized to obtain products of desired molecular weight by contacting said diolefins with phosphorus pentoxide under polymerizing conditions of temperature and time. In order to obtain maximum yields of desired polymers, it is necessary that the reaction be carried out under substantially anhydrous conditions. As shown in examples which follow, the presence of even small amounts of water is deleterious to yield.

The starting materials of this invention are open chain conjugated diolefins having from 4 to 10 carbon atoms per molecule and the cyclic dimers of 1,3-butadiene. These dimers are the vinylcyclohexenes and ethylidene cyclohexenes. The formulae of these compounds are shown below:

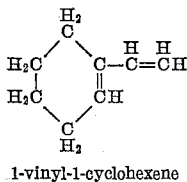

1-vinyl-1-cyclohexene

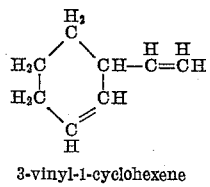

3-vinyl-1-cyclohexene

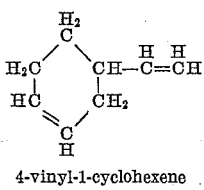

4-vinyl-1-cyclohexene

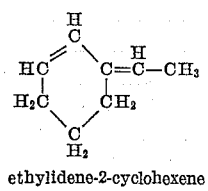

ethylidene-2-cyclohexene

Examples of the open chain diolefins that can be used as starting materials are 1,3-butadiene, isoprene (2-methyl-1,3-butadiene), piperylene (1,3-pentadiene), 2,3-dimethyl-1,3-butadiene, 2,4-hexadiene, 2,5-dimethyl-2,4-hexadiene, 2,4-heptadiene, 2,6-dimethyl-1,3-heptadiene, 7-methyl-2,4-octadiene, and 1,3-decadiene. These open chain diolefins and the methods for preparing them are well known in the art. Likewise, the vinylcyclohexenes and ethylidene cyclohexenes are well known compounds. 4-vinyl-1-cyclohexene is a commercially available chemical and the other mentioned cyclic dimers of butadiene can be prepared from 4-vinyl-1-cyclohexene by known isomerization methods. In fact, under the conditions of this invention, the phosphorus pentoxide used as a polymerization catalyst appears also to act to some degree as an isomerization catalyst so that when any particular isomer of a vinylcyclohexene is used as the feed material in the pure form, at least some of the other isomers may be preliminarily formed and enter into the polymerization reaction.

As previously stated, it is necessary that the feed materials, according to this invention, be substantially anhydrous when brought into contact with the phosphorus pentoxide catalyst. The starting materials can be rendered substantially anhydrous by methods known in the art, e.g., distillation or contact with a non-reactive drying agent such as anhydrous calcium sulfate, silica-gel, or activated alumina.

The temperature of reaction according to the invention is in the range 80 to 300° C., preferably 90 to 225° C. The pressure is a sufficient pressure to maintain the reactant diolefin substantially in the liquid phase. Pressures in excess of this pressure can be used if desired. The reaction time is in the range 6 minutes to 15 hours, preferably 15 minutes to 5 hours. The amount of phosphorus pentoxide used as catalyst is in the range 0.1 to 10% and preferably 0.5 to 3% based on the weight of the diolefin used as starting material. Larger amounts of the phosphorus pentoxide catalyst can be used if desired. However, one of the advantages of the invention is that only small amounts of catalyst are needed, whereas in the methods known in the prior art much larger amounts of catalyst are required. If desired, the phosphorus pentoxide can be supported on an inert support such as activated carbon, alumina, silica or pumice and used in the form of a fixed bed catalyst, or it can be used in a finely-divided form suspended in the reactant material.

The feed diolefin can be diluted with an inert diluent such as normal pentane, normal hexane, octane, methyl chloride, ethyl chloride, carbon tetrachloride and similar materials. Since the polymerization reaction is exothermic, it is desirable to provide some method or means for removing heat from the reaction zone. One method for removing heat is to select an inert diluent of such boiling point that the diluent boils at approximately reaction temperature, thus removing exothermic heat of reaction by virtue of the latent heat of vaporization of the diluent. It will be obvious to those skilled in the art that other methods of abstracting heat such as the use of a water-jacketed reactor can be used.

The novel products prepared according to the present invention comprise trimers, tetramers and pentamers, as well as some higher polymers of the starting materials. Such products produced when a vinylcyclohexene is used as the feed material are of particular utility as softeners for synthetic and other elastomers and as constituents of coating compounds, as well as chemical intermediates for the production of other high molecular weight compounds.

The trimer of 4-vinyl-1-cyclohexene produced in accordance with this invention is a light yellow liquid having a boiling range of 165 to 185° C. at a pressure of 1 mm. Hg. The wide boiling range of this material is believed to be attributable to the presence of several different isomers. The trimer has a molecular weight of 324, a carbon content of 88.8 weight percent, a viscosity of 4,204 Saybolt Universal seconds at 100° F., and an experimentally determined bromine number of 134.

Another product of the invention, also useful for the purposes set forth above, is a mixture of the tetramer, the pentamer and the hexamer of vinylcyclohexene and appears to be predominantly pentamer. It is a yellow solid resinous material at 20° C. It has an average molecular weight of 516, a carbon content of 88.8 weight percent, a hydrogen content of 11.2 weight percent, and an experimentally determined bromine number of 125 (calculated, 118). Although the chemical structure of these materials has not been definitely established, their physical and chemical properties indicate that they are highly cyclic materials and are decidedly different from the well known predominantly open chain polymers of diolefins.

In one embodiment of the invention, an open chain diolefin is charged to a reaction zone containing the phosphorus pentoxide catalyst and after a suitable reaction time, as disclosed, the product is withdrawn and passed to a fractionation zone. Fractionation of the product indicates that the open chain diolefin, particularly 1,3-butadiene, may be polymerized first to vinyl cyclohexene which then enters further into the polymerization reaction. Thus, one advantageous mode of practicing the invention is to fractionate the product to obtain a mixture of unreacted butadiene and vinylcyclohexene and to recycle this mixture to the reaction zone.

The used catalyst can be recovered and regenerated by known means, such as the burning off of any carbonaceous matter, or in many cases, since only small amounts of the catalyst are used, the catalyst can be removed from the reaction product by washing with water or an aqueous alkali and the wash mixture can be utilized for any purpose desired, e.g., recovery of phosphoric acid or a phosphate and subsequent use for any of the purposes to which these compounds can be applied.

As stated, the polymers produced according to this invention, and particularly the dimers, trimers, tetramers and pentamers of vinylcyclohexene can be used as softeners for elastomers. The softener is incorporated into the elastomer by methods known in the art. The amount of softener used is in the range 5 to 40% and preferably 10 to 30%, based on the weight of the elastomer. Specific elastomers with which the polymers of this invention can be used as softeners are natural rubber and synthetic rubber, such as the elastomeric polymers of butadiene or isoprene, and the copolymers of butadiene or isoprene with acrylonitrile or styrene.

EXAMPLE I

Twenty grams of pure grade 4-vinyl-1-cyclohexene and 2.51 grams of phosphorus pentoxide were charged to a glass reactor equipped with condenser, stirrer, thermometer and addition funnel. After charging, the reactor was heated and at the end of ten minutes the temperature thereof was 237° C. Additional vinylcyclohexene in the amount of 142 grams was added during the succeeding 15 minutes, the reactor temperature being maintained at 215° C.

The reactor was then cooled to room temperature (20° C.) and the reactor contents were washed with 5 weight percent aqueous potassium hydroxide. Unreacted vinylcyclohexene was recovered by distillation and 147.17 grams of polymeric products were obtained as distillation residue. This represents a conversion of 91.0 percent. Properties of the products are recorded in the following table.

| Product | Boiling Range | Average Mol. Weight | C, Weight Percent | H, Weight Percent | Visc., 100° F. | Bromine No. | Gms. of Product | Percent Yield |
|---|---|---|---|---|---|---|---|---|
| Dimer | 90–115° C. at 1 mm. Hg | 217 | 88.78 | 10.96 | 50.52 SUS | 137 | 75.06 | 46.4 |
| Intermediate fractionation product | | | | | | | 3.39 | 2.1 |
| Trimer | 165–200° C. at 1 mm. Hg | 340 | 88.8 | 11.4 | 4,204 SUS | 134 | 47.23 | 29.2 |
| Tetramer, pentamer, and higher [1] | | 516 | 88.0 | 11.2 | | 125 | 21.49 | 13.3 |

[1] Solid at room temperature.

The foregoing data show that high yields of specific polymers, predominantly dimers to pentamers, are obtained according to the invention when relatively small amounts of phosphorus pentoxide are used as a catalyst.

In this and the subsequent examples, percentage yields are based on diolefin charge.

EXAMPLE II

Pure grade 4-vinyl-1-cyclohexene (928.5 grams) was charged to a glass reactor along with 3.3 grams of phosphorus pentoxide and refluxed for 1 hour. There was then added 2.67 grams of additional phosphorus pentoxide and the reactor temperature raised to 137° C. and maintained at 137 to 150° C. for 4 hours. The reactor was then cooled to room temperature (20° C.) and the product recovered in the manner described in Example I. A conversion of 87.5 percent was obtained. Distillation of the polymeric materials formed provided the following products:

| Product | Boiling Range | Weight Percent of Total Products | Percent Yield |
|---|---|---|---|
| Dimer | 90–115° C. at 1 mm. Hg. | 45.0 | 39.4 |
| Intermediate fractionation product. | | 5.6 | 4.9 |
| Trimer | 165–200° C. at 1 mm. Hg. | 30.5 | 26.7 |
| Tetramer-pentamer mixture [1] | | 18.9 | 16.55 |

[1] Solid at room temperature.

EXAMPLE III

Pure grade 4-vinyl-1-cyclohexene (1006 grams) was dried for 48 hours with calcium sulfate and was then charged to a glass reactor along with 4.46 grams of phosphorus pentoxide and refluxed for 0.5 hour. There was then added 9.16 grams of additional phosphorus pentoxide and the reactor was heated until the contents refluxed. At a reactor temperature of 132° C. an exothermic reaction was initiated and the heating mantle was removed from the reactor. After 27 minutes the reactor temperature had risen to 215° C. The reactor was then cooled to room temperature (20° C.) and the products were worked up in the usual manner. The conversion was 93.9 percent. Distillation of the polymeric materials formed provided the following products:

| Product | Boiling Range | Weight Percent of Total Product | Percent Yield |
|---|---|---|---|
| Dimer | 90–115° C. at 1 mm. Hg. | 50.0 | 46.8 |
| Trimer | 165–200° C. at 1 mm. Hg. | 28.1 | 26.4 |
| Tetramer-pentamer mixture [1] | | 21.9 | 20.6 |

[1] Solid at room temperature.

EXAMPLE IV

The following run is included to demonstrate the undesirability of water in the reaction mixture of the present invention.

4-vinyl-1-cyclohexene (962 grams) containing 0.05 to 0.1 weight percent of dissolved water was charged to a glass reactor along with 3.74 grams of phosphorus pentoxide and refluxed for 0.25 hour. There was then added 4.3 grams of additional phosphorus pentoxide and refluxing continued for an additional 55 minutes. At this point 3.1 grams of additional phosphorus pentoxide was added and heating continued for 20 minutes. The final reactor temperature at reflux was 134° C. The reaction mixture was cooled and the products were worked up in the usual manner.

Unchanged vinylcyclohexene was distilled directly from the reactor, and heating was continued until the reactor temperature reached 200° C. The polymeric products remaining were then worked up in the usual manner. The distillation process added about 2 hours to the reaction time. The conversion was 29.8 percent. Distillation of the polymeric materials formed provided the following products:

| Product | Boiling Range | Weight Percent of Total Product | Percent Yield |
|---|---|---|---|
| Dimer | 90–115° C. at 1 mm. Hg. | 46.5 | 13.85 |
| Intermediate fractionation product | | 6.2 | 1.85 |
| Trimer | 165–200° C. at 1 mm. Hg. | 24.5 | 7.3 |
| Tetramer-pentamer mixture [1] | | 22.8 | 6.8 |

[1] Solid at room temperature.

Dry 4-vinyl-1-cyclohexene (568 grams) recovered by distillation from the reaction mixture described above was charged to a glass reactor along with 2.07 grams of phosphorus pentoxide and refluxed for 0.5 hours. There was then added 3.50 grams of additional phosphorus pentoxide and heating resumed and continued for 1⅓ hours. At the end of this time the reactor temperature was 197° C. The reaction mixture was cooled and the products were worked up in the usual manner. Conversion was 91.5 percent. Distillation of the polymeric materials formed provided the following products:

| Product | Boiling Range | Weight Percent of Total Product | Percent Yield |
|---|---|---|---|
| Dimer | 90–115° C. at 1 mm. Hg. | 31.3 | 28.6 |
| Intermediate fractionation product | | 2.7 | 2.46 |
| Trimer | 165–200° C. at 1 mm. Hg. | 29.8 | 27.3 |
| Tetramer-pentamer mixture [1] | | 36.7 | 33.6 |

[1] Solid at room temperature.

The data in this example show the pronounced deleterious effect on yield of even very small amounts of water in the starting material. The amount of water present in the undried vinylcyclohexene was only the amount of water which could be physically dissolved in the hydrocarbon feed. The amount of phosphorus pentoxide present was stoichiometrically in substantial excess of the amount necessary to react with all of the water present to form phosphoric acid. Thus, the catalyst in this particular run was phosphorus pentoxide containing phosphoric acid as an impurity and the yield obtained with this contaminated catalyst was substantially reduced, in comparison with that obtainable under anhydrous conditions.

EXAMPLE V

*Polymerization of vinylcyclohexene using phosphoric acid*

A comparative run was made wherein 196 grams of 4-vinyl-1-cyclohexene was charged to a reactor along with 4 grams of 85 percent phosphoric acid and refluxed at 125–130° C. for 4 hours. There was obtained 7 grams of a polymeric material resembling vinylcyclohexene dimer. This represented a conversion of 3.57 percent.

This example shows that 85% phosphoric acid produces only small yields of vinylcyclohexene polymers and, when compared with the data of preceding examples, effectively demonstrates the superiority of phosphorus pentoxide over concentrated phosphoric acid as a catalyst for the polymerization.

EXAMPLE VI

Samples of vinylcyclohexene trimer and vinylcyclohexene tetramer-pentamer mixture obtained from the runs of the preceding examples were evaluated as softeners in a 1,3-butadiene-acrylonitrile copolymer (known commercially as Paracril B) prepared by emulsion polymerization. The following compounding recipes were employed, the recipe designated I having a softener loading of 10 parts softener per 100 parts elastomer and the recipe designated II having a softener loading of 30 parts softener per 100 parts elastomer.

| | Parts by weight | |
|---|---|---|
| | I | II |
| 1,3-butadiene-acrylonitrile copolymer | 100 | 100 |
| Philblack A [1] | 60 | 60 |
| Zinc oxide | 5 | 5 |
| Stearic acid | 1.5 | 1.5 |
| Sulfur | 1.5 | 2.0 |
| Altax [2] | 1.5 | 1.75 |
| Softener | 10 | 30 |

[1] Medium abrasion furnace black.
[2] Benzothiazyl disulfide.

The samples were compounded and cured at 307° F. for 45 minutes. The results obtained are recorded in the following tabulation:

| Softener | 80° F. | | | | Percent[2] Swelled | Percent[2] Extracted | Shore Hardness | 212° F. Compression Set, Percent | Compounded MS, 1½ at 212° F. | Freeze Pt., °C., Gehman |
|---|---|---|---|---|---|---|---|---|---|---|
| | PHR[1] Softener, p.s.i. | 300% Modulus, p.s.i. | Tensile | Percent Elongation | | | | | | |
| Vinylcyclohexene | 10 | 1,310 | 2,130 | 470 | 41.8 | 7.2 | 62.5 | 15.4 | 38.0 | −29 |
| Trimer | 30 | 1,240 | 2,200 | 495 | 19.5 | 16.6 | 48 | 13.2 | 19.0 | −29 |
| Vinylcyclohexene | 10 | 1,730 | 2,460 | 425 | 38.6 | 8.6 | 60 | 13.3 | 42.5 | −28 |
| Tetramer-pentamer mixture | 30 | 1,730 | 2,380 | 420 | 22.8 | 16.3 | 55.5 | 15.0 | 20.5 | −27 |
| Control | 0 | 3,230 | 3,230 | 300 | 48.4 | 1.9 | 70 | 7.1 | 60.0 | −29 |

OVEN AGED 24 HRS. AT 212° F.

| Vinylcyclohexene | 10 | 1,770 | 2,320 | 390 | | | | | | |
| Trimer | 30 | 1,490 | 2,070 | 400 | | | | | | |
| Vinylcyclohexene | 10 | 2,280 | 2,950 | 390 | | | | | | |
| Tetramer-pentamer mixture | 30 | 1,830 | 2,220 | 340 | | | | | | |
| Control | 0 | | 3,330 | 235 | | | | | | |

[1] PHR—parts per 100 parts of rubber.
[2] 45 minutes' cure.

The foregoing data show that the polymers of vinylcyclohexene according to this invention are satisfactory softeners for butadiene-acrylonitrile rubber.

EXAMPLE VII

*Polymerization of 1,3-butadiene over phosphorus pentoxide*

A pressure reactor, equipped with stirrer and heating jacket, was charged with 107 grams of anhydrous n-hexane and 6.0 grams of phosphorus pentoxide. 1,3-butadiene (295.5 grams) was charged over a 7 hour period at a reactor temperature of 120 to 168° C. and pressures of 100–250 p.s.i.g. The reaction mixture was cooled and the products were worked up in the usual manner.

The product was washed with 10 weight percent aqueous potassium hydroxide and then with water. Conversion of 1,3-butadiene was 65.8 percent. Distillation of the polymeric materials formed provided the following products:

| Product | Boiling Range, °C | Bromine No. | Weight Percent of Total Product | Percent Yield |
| --- | --- | --- | --- | --- |
| 1,3-butadiene dimer | 128 | 291 | 18.5 | 12.15 |
| 1,3-butadiene trimer | 200–230 | 160 | 19.5 | 12.8 |
| 1,3-butadiene tetramer | 270–320 | 158 | 13.5 | 8.85 |
| Higher polymers | | 144 | 48.5 | 31.8 |

EXAMPLE VIII

A run was made according to the procedure of Example VII wherein the temperature of reaction was lowered to 95° C. and pressures in the range from 45–130 p.s.i.g. were employed. The initial charge to the reactor comprised 14.0 grams of phosphorus pentoxide and 113.0 grams of dry n-hexane. 1,3-butadiene (251.1 grams) was then charged over a period of 13 hours at the pressure and temperature previously mentioned. The reaction mixture was cooled and the products were worked up in the usual manner.

The product was washed with 10 weight percent aqueous potassium hydroxide and then with water. Conversion of 1,3-butadiene was 53.5 percent. Distillation of the polymeric materials formed provided the following products:

| Product | Boiling Range, °C | Bromine No. | Weight Percent of Total Product | Percent Yield |
| --- | --- | --- | --- | --- |
| 1,3-butadiene dimer | 128 | | 2.6 | 1.39 |
| 1,3-butadiene trimer | 200–230 | 134 | 20.3 | 10.85 |
| 1,3-butadiene tetramer | 270–320 | 173 | 17.2 | 9.2 |
| Higher Polymers | | 150 | 59.9 | 32 |

EXAMPLE IX

*Polymerization of isoprene*

Twenty grams of isoprene was charged to a reactor along with 3.77 grams of phosphorus pentoxide and refluxed until the reactor temperature was 95° C. An additional 136 grams of isoprene was then added over a period of 1 hour and 50 minutes, the reactor temperature being maintained in the range of 150–170° C. The reactor was cooled to room temperature (20° C.) and the reaction mixture was washed with 10 weight percent aqueous potassium hydroxide and then with water. Conversion of isoprene was 83 percent. Distillation of the polymeric materials formed provided the following products:

| Product | Bromine No. | Weight Percent of Total Product | Percent Yield |
| --- | --- | --- | --- |
| Isoprene dimer | | 3.4 | 2.82 |
| Polymer boiling in the range 270–350° C. | 130 | 40.1 | 33.2 |
| Higher polymer | 110 | 56.5 | 46.8 |

Variation and modification are possible within the scope of the disclosure and the claims of this invention, the essence of which is that novel polymers are obtained by subjecting to polymerization conditions of temperature and pressure a diolefin selected from the group consisting of open chain diolefins having from 4 to 10 carbon atoms per molecule and cyclic dimers of butadiene in the presence of a small amount of a phosphorous pentoxide catalyst; and a novel elastomer composition is obtained by incorporating the polymers produced into an elastomer.

I claim:

1. A process which comprises contacting with a catalyst consisting essentially of solid phosphorus pentoxide a diolefin selected from the group consisting of open chain diolefins having from 4 to 10 carbon atoms per molecule and the cyclic dimers of butadiene at a temperature in the range 80 to 300° C., a pressure sufficient to maintain substantially liquid phase conditions, a reaction time in the range 6 minutes to 15 hours, the amount of phosphorus being in the range 0.1 to 10 weight percent based on the weight of said diolefin, the polymerization being conducted under substantially anhydrous conditions, and recovering a product polymer.

2. A process which comprises contacting a vinylcyclohexene with a catalyst consisting essentially of solid phosphorus pentoxide under substantially anhydrous conditions for a time in the range 15 minutes to 5 hours at a temperature in the range 90 to 225° C. and a pressure sufficient to maintain said vinylcyclohexene substantially in the liquid phase, the amount of phosphorus pentoxide being in the range 0.5 to 3 weight percent based on the weight of said vinylcyclohexene, and recovering a polymer as a product of the process.

3. A process which comprises contacting 1,3-butadiene, under substantially anhydrous conditions, with a catalyst consisting essentially of solid phosphorus pentoxide at a temperature in the range 90 to 225° C. and a pressure sufficient to maintain said butadiene substantially in the liquid phase, for a time in the range 15 minutes to 5 hours, the amount of phosphorus pentoxide being in the range 0.5 to 3 weight percent based on the weight of said butadiene, recovering a product of said contacting, separating from said product a mixture comprising unreacted butadiene and cyclic dimers thereof, recycling said mixture to the contacting zone, and recovering a cyclic polymer from the distillation residue.

4. A process which comprises contacting isoprene, under substantially anhydrous conditions and in the liquid phase with a catalyst consisting essentially of solid phosphorus pentoxide in a polymerization zone at a temperature in the range 150 to 170° C. for a time in the range 15 minutes to 5 hours, the amount of phosphorus pentoxide being in the range 0.5 to 3 weight percent based on the weight of said isoprene, and recovering a cyclic polymer of isoprene as a product of the process.

5. A process which comprises subjecting a diolefin selected from the group consisting of open chain diolefins having from 4 to 10 carbon atoms per molecule and the cyclic dimers of butadiene to polymerization conditions including a temperature in the range of 80 to 300° C., a pressure sufficient to maintain substantially liquid phase conditions, and a reaction time in the range of 6 minutes to 15 hours in contact with a catalyst consisting essentially of phosphorus pentoxide under anhydrous conditions so as to polymerize said diolefin.

6. The process of claim 5 in which said catalyst is in solid form supported on an inert solid material.

7. A polymer of a diolefin selected from the group consisting of open chain diolefins having from 4 to 10 carbon atoms per molecule and the cyclic dimers of butadiene produced by the polymerization of said diolefin in contact with a catalyst consisting essentially of solid phosphorus pentoxide as the sole catalyst under polymerizing conditions including a temperature in the range of 80 to 300° C., a pressure sufficient to maintain substantially liquid phase conditions, and a reaction time in the range of 6 minutes to 15 hours and under anhydrous conditions.

8. A polymer of claim 7 made by polymerizing vinylcyclohexene.

9. A polymer of claim 7 comprising tetramer, pentamer, and hexamer made by polymerizing vinylcyclohexene and recovering a mixture of tetramer, pentamer, and hexamer from the resulting polymer.

References Cited in the file of this patent

UNITED STATES PATENTS

| | | |
|---|---|---|
| 2,238,594 | Malishev | Apr. 15, 1941 |
| 2,271,942 | Keunecke et al. | Feb. 3, 1942 |
| 2,457,306 | Dreyfus et al. | Dec. 28, 1948 |
| 2,460,973 | Calfee et al. | Feb. 8, 1949 |
| 2,513,243 | Leary et al. | June 27, 1950 |
| 2,513,244 | Swaney et al. | June 27, 1950 |
| 2,521,437 | Young et al. | Sept. 5, 1950 |
| 2,550,139 | Daly | Apr. 24, 1951 |
| 2,614,136 | Kolfenbach et al. | Oct. 14, 1952 |